United States Patent [19]

Mori

[11] Patent Number: 4,556,930

[45] Date of Patent: Dec. 3, 1985

[54] LIGHT RADIATION DEVICE AND METHOD FOR TRAPPING FISH

[76] Inventor: Kei Mori, 3-16-3-501, Kaminoge, Setagaya-ku, Tokyo, Japan

[21] Appl. No.: 398,634

[22] Filed: Jul. 15, 1982

[30] Foreign Application Priority Data

Jul. 18, 1981 [JP] Japan ................... 56-112511

[51] Int. Cl.$^4$ .................. F21V 7/04; A01K 75/02
[52] U.S. Cl. .................. 362/32; 362/303; 362/308; 43/17.1; 43/17.5
[58] Field of Search .......... 362/32, 282, 301, 303, 362/305, 308, 322, 328, 332; 43/17.5, 17.6, 4.5, 17.1; 350/96.1

[56] References Cited

U.S. PATENT DOCUMENTS

| | | | |
|---|---|---|---|
| 1,430,433 | 9/1922 | Brown | 362/303 |
| 3,005,280 | 10/1961 | Vang | 43/17.1 |
| 3,441,957 | 4/1969 | Friedman | 362/32 |
| 3,502,861 | 3/1970 | Evans | 362/267 |
| 3,536,908 | 10/1970 | Oster | 362/32 |
| 4,152,752 | 5/1979 | Niemi | 362/32 |
| 4,281,366 | 7/1981 | Wurster et al. | 362/308 |
| 4,389,085 | 6/1983 | Mori | 350/258 |
| 4,420,796 | 12/1983 | Mori | 362/32 |

FOREIGN PATENT DOCUMENTS

| | | | |
|---|---|---|---|
| SU665877 | 6/1979 | European Pat. Off. | |
| 2658700 | 12/1976 | Fed. Rep. of Germany . | |
| 139830 | 12/1946 | Switzerland | 362/308 |
| 251299 | 2/1970 | U.S.S.R. | 43/17.5 |
| 651764 | 3/1979 | U.S.S.R. | 43/17.5 |

Primary Examiner—Magdalen Y. C. Moy
Attorney, Agent, or Firm—Merchant, Gould, Smith, Edell, Welter & Schmidt

[57] ABSTRACT

A light radiation device for trapping fish, comprising a light source, a reflecting mirror for reflecting the light from the light source so as to change it to parallel light, a lens system for focusing the parallel light from the reflecting mirror, and an optical cable into which the light focused by the lens system is introduced at one end thereof. The optical cable is provided at the other end thereof with a light leakage portion or a light radiator, which radiates the light onto or into the sea so as to attract the fish.

10 Claims, 10 Drawing Figures

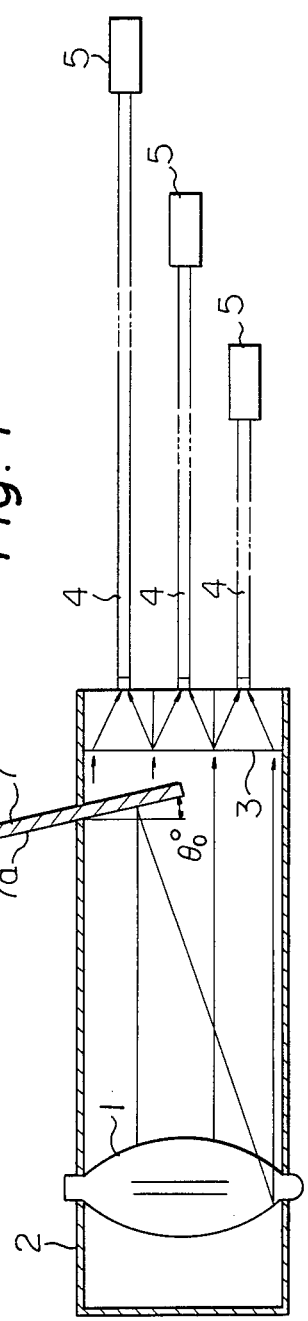
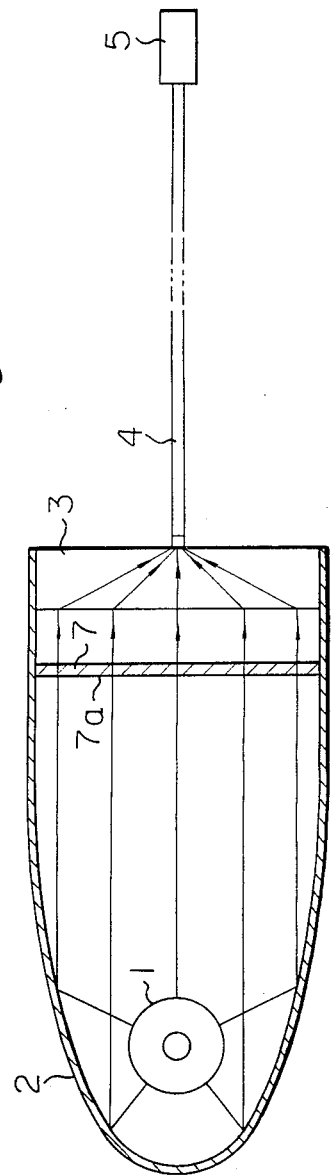

LIGHT RADIATION DEVICE AND METHOD FOR TRAPPING FISH

BACKGROUND OF THE INVENTION

The present invention relates to an improved light radiation device for trapping fish, by which light is radiated into the sea, lakes, or rivers (hereinafter referred to as "sea") in order to attract fish to a certain spot and/or to trap those attracted fish, more particularly to such a light radiation device for effectively and safely radiating light from a source into the sea.

Several techniques are already known for radiating light into the sea from a light source to attract and/or trap fish. One known method is to directly introduce electric bulbs into the sea. With this method, however, there are the problems of broken bulbs, cut cables, electric leakages (short-circuits), and the like. Another known method is to radiate light onto the sea from electric bulbs mounted at the end of an arm projected from a ship. With this method, however, there is the problem of low efficiency light radiation due to loss of light.

SUMMARY OF THE INVENTION

An object of the present invention is to provide a light radiation device for trapping fish capable of overcoming the defects mentioned above.

Another object of the present invention is to provide a light radiation device for trapping fish capable of introducing light from a few light sources into various directions so as to effectively and safely radiate the light onto or into the sea.

According to the present invention, there is provided a light radiation device for trapping fish, comprising a light source, a reflecting mirror for reflecting the light from said light source so as to change it to parallel light, a lens system for focusing the parallel light from said reflecting mirror, and an optical transmitting means into which the light focused by said lens system is introduced, said optical transmitting means radiating the light so as to attract fish.

BRIEF DESCRIPTION OF THE DRAWINGS

The present invention may be more fully understood from the description set forth below of preferred embodiments of the invention, together with the accompanying drawings:

FIG. 1 is a cross-sectional plan (or elevational) view illustrating a part of an embodiment of a device according to the present invention;

FIG. 2 is a cross-sectional elevational (or plan) view illustrating the same part as FIG. 1;

DESCRIPTION OF PREFERRED EMBODIMENTS

Referring now to FIGS. 1 and 2, a light radiation device for trapping fish according to the present invention comprises light source 1, such as an electric bulb; reflecting mirror 2, for instance, a parabolic mirror, which reflects light from light source 1 to change it to parallel light; lens system 3, which focuses the parallel light from reflecting mirror 2; and light transmitting means 4, for instance optical cables, optical rods, or optical tubes. At one end, light transmitting means 4 receives the light focused by lens system 3 and transmits the same. At the other end, light transmitting means 4 has formed a light leakage portion or has attached a light radiator, so that the light transmitted via light transmitting means 4 is radiated by the light leakage portion or the light radiator.

Figure 3:
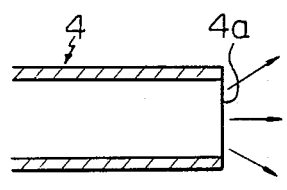
FIGS. 3 through 5 are cross-sectional views illustrating embodiments of light leakage portions of optical cables.
Figure 4:
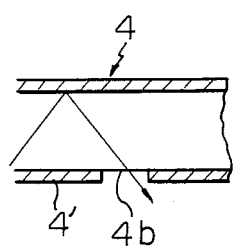
Figure 5:
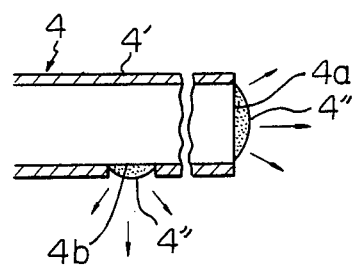

FIGS. 3 through 5 are cross-sectional views illustrating embodiments of light leakage portions, each of which is formed at the end of an optical cable used as the light transmitting means. In FIG. 3, optical cable 4 is cut at one end to form cut end face 4a for radiation of light therefrom. FIG. 4 illustrates an embodiment wherein a part of cladding 4' of optical cable 4 is excised to form cut side face 4b for radiation of light therefrom. FIG. 5 illustrates an embodiment wherein light dispersing means 4" is provided on cut end face 4a or cut side face 4b of optical cable 4.

Figure 6:
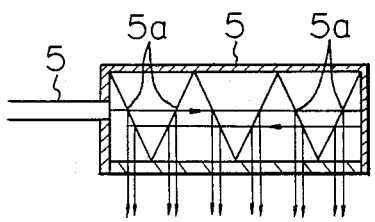
FIGS. 6 and 7 are cross-sectional views illustrating embodiments of light radiators.

FIG. 6 is a cross-sectional view illustrating an embodiment of light radiator 5 attached to the end of the optical cable 4. Light radiator 5 of this embodiment has, for instance, a plurality of semitransparent prisms 5a provided inside. Light transmitted through optical transmitting means 4 is introduced into light radiator 5. Part of the light passes through semitransparent prisms 5a. The remaining part of the light is reflected by semitransparent prisms 5a. As a result, all the light is finally radiated to the outside through the side wall of light radiator 5. A detailed description of light radiator 5 of this embodiment may be found in Japanese Patent Application No. 56-66941.

Figure 7:
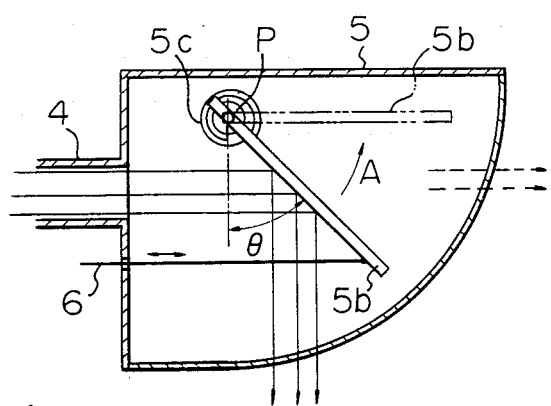

FIG. 7 is a cross-sectional view illustrating another embodiment of light radiator 5 attached to the end of optical transmitting means 4. Light radiator 5 of this embodiment has light reflecting plate 5b provided inside. The side of light reflecting plate 5b to which the light is introduced is formed as a light reflecting mirror surface. Light reflecting plate 5b is pivotally mounted in light radiator 5 by, for example, pin P, and is biased to the direction shown by arrow A by means of spring 5c. In addition, the angle defined by light reflecting plate 5b may be adjustable by means of, for example, adjusting string 6. Therefore, if the angle $\theta$ of light reflecting plate 5b is adjusted at the position shown in the drawing (in this case $\theta$ is about 45°) by tensioning adjusting string 6, the light transmitted through optical transmitting means 4 and introduced into light radiator 5 is reflected by light reflecting plate 5b and radiated downwardly in a substantially vertical direction into the sea, as shown in the drawing. If light reflecting plate 5b is adjusted as shown by the imaginary line in the drawing by loosening adjusting string 6, the light radiated from optical transmitting means 4 goes straight forward without being reflected by light reflecting plate 5b and is radiated in the horizontal direction into the sea. As clearly understood from the foregoing explanation, light reflecting plate 5b can be optionally adjusted between the positions indicated by the real line and the imaginary line in the drawing by adjusting the tension of adjusting string 6. Therefore, the light transmitted through optical transmitting means 4 can be adjusted to be radiated in the desired direction between the vertical downward direction and the horizontal direction by means of light reflecting plate 5b.

Method of Use

The embodiment of the invention shown in FIG. 7 and as described above can be used to practice a method of trapping fish by performing the steps of illuminating the light source, passing the resulting light to the radiator through the lens system and the optical cable, and moving the reflecting means between the first position and the second position so that the light is reflected between a vertical downward direction into the sea and a horizontal direction.

According to the present invention, the light can be radiated into the sea from the light leakage portion or the light radiator constituted as mentioned above, although the light source system may be situated on a ship, the light leakage portion or the light radiator may be located on or inside the sea, and the light transmitting media or means optically inter-connects therebetween. Therefore, it is neither necessary to arrange electric bulbs on or inside the sea or to provide electric wires, therefore there is no possibility of electric leakage or short-circuits. Generally speaking, when radiating light onto or inside the sea to attract fish, various techniques are used to attract the fish more effectively. For example, the light may be alternately turned on and off. Or, a plurality of radiating spots may be provided and successively turned off from the spot furthest from the desired area to the spot nearest the desired area, thus leading the fish in. If it is desired to use the device of the present invention in the manner mentioned above, lens system 3 is constituted of a number of lenses and light deflecting plate 7 is provided in front of lens system 3, as seen in FIGS. 1 and 2, such that light deflecting plate 7 may be periodically inserted and removed to periodically turn on the light radiation. Alternatively, light deflecting plate 7 may be inserted such that the depth thereof is gradually increased over certain time intervals. In this way, it can first deflect the light introduced into the light transmitting means provided with a light leakage portion or a light radiator located at the furthest portion, then deflect the light introduced into light transmitting means provided with light leakage portions or the light radiations located at nearer positions. This enables one to gradually lead fish at long distances to nearer areas for collection or trapping. If face 7a of light deflecting plate 7 is formed as a light reflecting mirror and light deflecting plate 7 can be inserted at a certain angle $\theta_0$ with respect to the traveling direction of the parallel light, as shown in FIG. 1, the light reflected by light reflecting mirror surface 7a is returned toward light source 1 and reflected again by reflecting mirror 2. The reflected light then reaches lens system 3 through the portion under light deflecting plate 7 without coming into touch with light deflecting plate 7. Thus, the light source 1 can be effectively used. When providing a plurality of radiating spots successively turned off, as mentioned hereinbefore, this is especially effective in leading the fish, since the light radiating energy at the positions at which the light is radiated can be increased.

Figure 8:
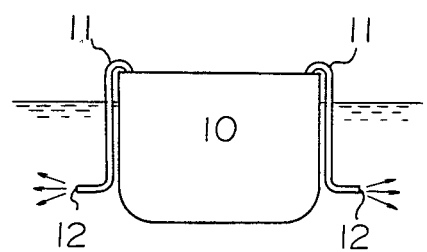
FIGS. 8 through 10 are schematic illustrations of light trappers of the present invention mounted on a ship.
Figure 10:
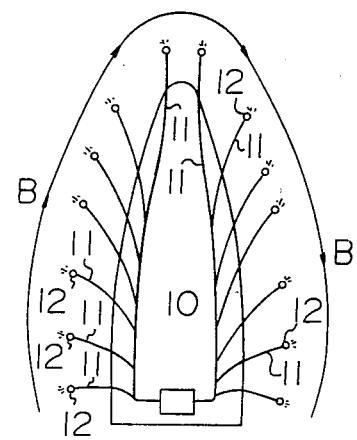
Figure 9:
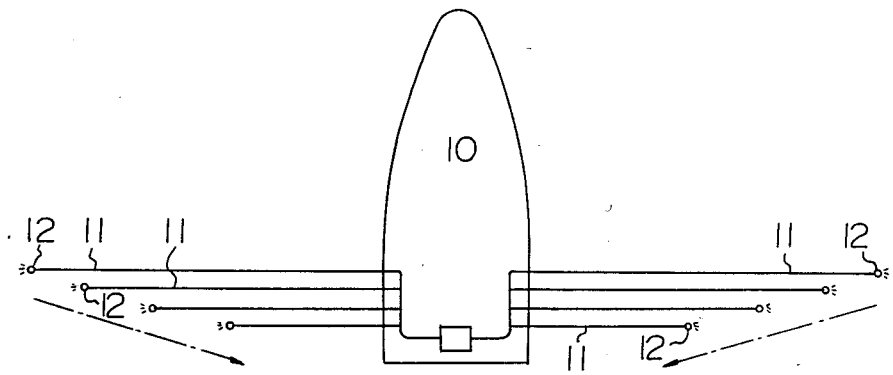

FIGS. 8 through 10 are illustrations of light trappers of the present invention as mounted on a ship, wherein reference numeral 10 indicates the ship, 11 the light transmitting means, and 12 portions from which the light is radiated.

In the embodiment shown in FIG. 8, the light radiating portions are provided in the sea so as to radiate light in the horizontal direction, thereby making it possible to lead and collect the fish from a long distance toward the area in the vicinity of ship 10.

According to the embodiment shown in FIG. 9, a large number of light radiating portions are provided over an area far from too close to ship 10. Light deflecting plate 7 is moved, as mentioned hereinbefore, so that the light radiating portions are successively turned off from the furthest spots to the nearest spot to lead and collect/trap the fish from a long distance toward the area near ship 10.

In the embodiment shown in FIG. 10, a large number of light radiating spots are provided around ship 10. Light deflecting plate 7 is moved, as mentioned hereinbefore, so that the light radiations from the light radiating portions are successively turned off, for instance, along the direction indicated by arrow B in FIG. 10, to lead fish around ship 10 along the direction indicated by arrow B for collection/trapping in a certain area.

Although in the embodiments illustrated in FIGS. 8 through 10, the light source is provided on the ship, the light source may also be provided on any suitable stationary object situated on the land or on the sea. In addition, although the light radiating spots are provided inside the sea according to the embodiments in FIGS. 8 through 10, they may also be provided on the sea. Further, the direction in which the light is radiated is not necessarily limited to the horizontal direction, but may also be the vertical direction or any other desired direction of an angle between the horizontal and vertical directions, which angle or direction may be suitably selected on the basis of the species, amount, and so forth of the fish to be trapped.

I claim:

1. A light radiation device for trapping fish, comprising a light source, a parabolic reflecting mirror for reflecting the light from said light source so as to change it to parallel light, a lens system for focusing the parallel light from said reflecting mirror, and an optical transmitting means for attracting fish, said optical transmitting means including an optical cable, having one end thereof into which the light focused by said lens system is introduced, and a light radiator, said optical transmitting means radiating the light from the other end of said optical cable through said radiator into the sea so as to attract fish, and including a regulating means by which the radiating light is adjusted to be radiated in a desired direction, said regulating means including an adjustable reflecting plate, said plate adjustable between a first position wherein light is emitted in a horizontal direction and a second position wherein light is emitted in a vertical direction.

2. A device as set forth in claim 1, wherein said optical cable is conformed so that the light radiating portion thereof is provided in contacting relation with the sea.

3. A device as set forth in claim 2, wherein said light radiating portion is conformed so as to radiate the light in a desired direction between and inclusive of the vertical and horizontal directions.

4. A device as set forth in claim 1, wherein said optical cable includes a light leakage portion at the light radiating portion of said optical cable.

5. A light radiation device for trapping fish, comprising a light source, a reflecting mirror for reflecting the light from said light source so as to change it to parallel light a lens system for focusing the parallel light from said reflecting mirror, and an optical transmitting means for attracting fish, said optical transmitting means including an optical cable, having one end thereof into which the light focused by said lens system is introduced, a light radiator, said optical transmitting means radiating the light from the other end of said optical cable through said radiator into the sea so as to attract fish, said optical cable is conformed so that the light radiating portion thereof is provided in contacting relation with the sea, and a regulating means by which the radiating light is adjusted to be radiated from said radiating portion in a desired direction said lens system including a plurality of lenses, with a plurality of said optical transmitting means respectively connected to said plurality of lenses; a movable light deflecting plate is provided between said light source and said lens system; and the side of said light deflecting plate onto which the light is introduced is formed as a second light reflecting mirror face and wherein said light deflecting plate is movably arranged at a certain angle with respect to the passage of light, so that the light reflected by said light reflecting mirror face returns toward said light source and is reflected again by the first reflecting mirror and introduced into said optical transmitting means through the portion which is not reflected by said light deflecting plate.

6. A light radiation device for trapping fish, comprising a light source, a reflecting mirror for reflecting the light from said light source so as to change it to parallel light, a lens system for focusing the parallel light from said reflecting mirror, and an optical transmitting means for attracting fish, said optical transmitting means including an optical cable, having one end thereof into which the light focused by said lens system is introduced, and a light radiator, said optical transmitting means radiating the light from the other end of said optical cable through said radiator into the sea so as to attract fish, said lens system including a plurality of lenses with a plurality of said optical cables being respectively connected to said plurality of lenses; a movable light deflecting plate is provided in front of said lens system; the side of said light deflecting plate onto which the light is introduced is formed as a second light reflecting mirror face and wherein said light deflecting plate is movably arranged at a certain angle with respect to the passage of light, so that the light reflected by said light reflecting mirror face returns toward said light source and is reflected again by the first reflecting mirror and introduced into said optical transmitting means through the portion which is not deflected by said light deflecting plate; said light radiating portions of said optical transmitting means are located along a fish leading route, said plurality of optical transmitting means being connected to said plurality of optical transmitting means being connected to said plurality of lenses and, the light introduced into said plurality of lenses being deflected in turn by said movable deflecting plate so that said light radiating portions are successively turned off along the fish leading route by a means for successively turning off said light radiating portions; and said light radiating portions are located over a range from a long distance to a short distance from the light source, and wherein the light radiating portions are successively turned off from the furthest one to the nearest one.

7. A device as set forth in claim 6, wherein the light source is provided on a ship, said light radiating portions are arranged around said ship, and said light radiating portions are successively turned off by said light deflecting plate so that the radiating spots move around said ship.

8. A method of trapping fish with a light source, a parabolic reflecting mirror positioned with respect to said light source to generate parallel light, an optical transmitting means including an optical cable, having opposite ends, positioned so that one end of said cable intercepts said parallel light, a focusing lens system positioned between said mirror and said end of said optical cable, a light radiator affixed to said opposite end of said cable, said light radiator positioned in contact with the sea and including an adjustable reflecting plate means for reflecting said light between a vertical downward direction and a horizontal direction, said reflecting plate adjustable between a first position and a second position; said method comprising the steps of:
illuminating said light source;
passing the resulting light to the radiator through said lens system and said optical cable; and
moving said reflecting means between said first position and said second position so that said light is reflected between a vertical downward direction into the sea and a horizontal direction.

9. A device as set forth in claim 1, wherein said optical transmitting means is conformed so as to radiate the light in the direction perpendicular to the surface of the sea.

10. A device as set forth in claim 1, wherein said optical transmitting means is conformed so as to radiate the light in a desired direction between the vertical and horizontal directions.

* * * * *